Patented Dec. 9, 1924.

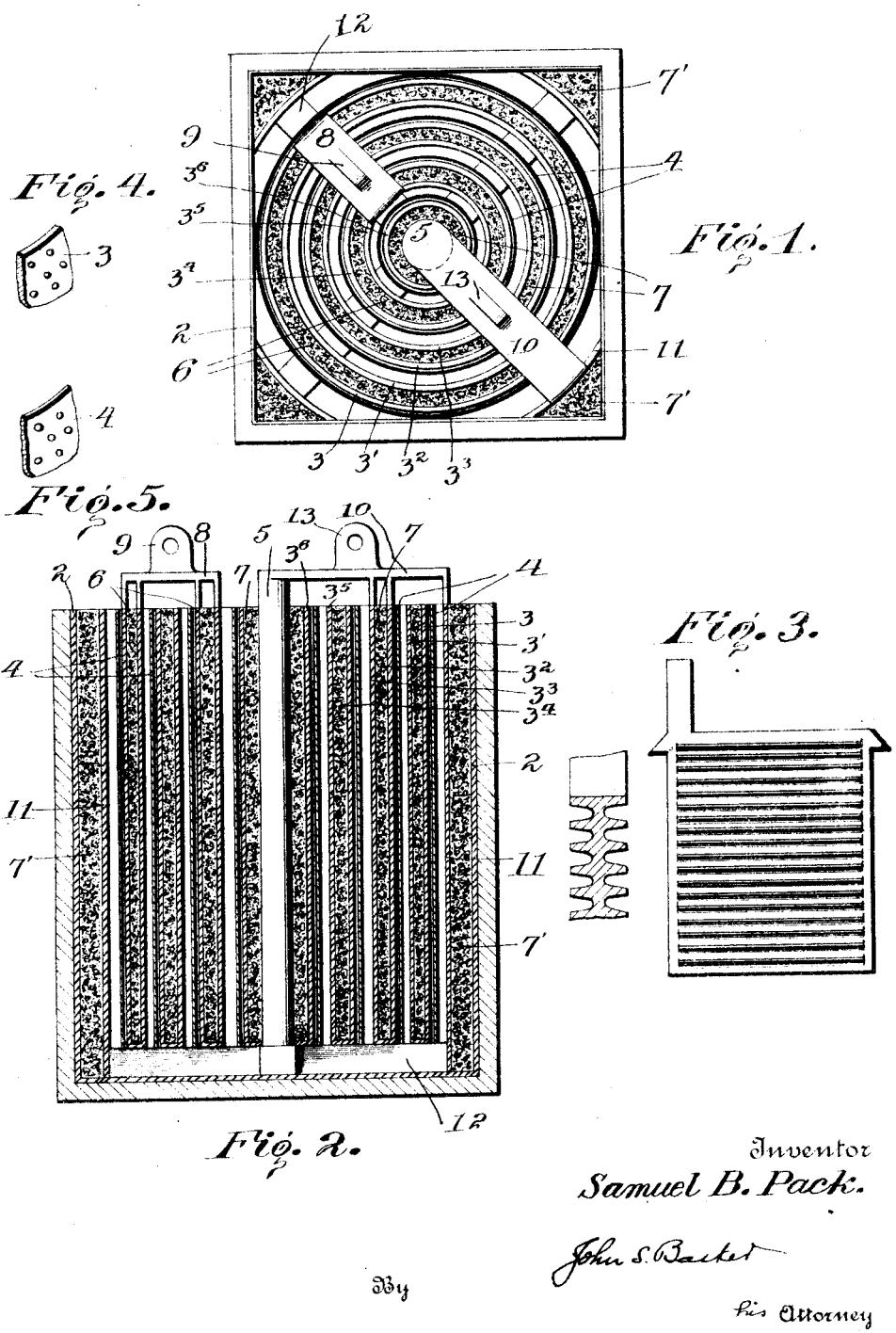

1,518,814

UNITED STATES PATENT OFFICE.

SAMUEL B. PACK, OF WASHINGTON, DISTRICT OF COLUMBIA.

ELECTRIC BATTERY.

Application filed November 18, 1919, Serial No. 338,916. Renewed February 15, 1923.

*To all whom it may concern:*

Be it known that I, SAMUEL B. PACK, a citizen of the United States, residing at Washington, District of Columbia, have invented certain new and useful Improvements in Electric Batteries, of which the following is a specification.

My invention relates to electric batteries, and particularly to storage or secondary batteries. It has for its object to utilize iron in novel form and manner in the manufacture and operation of such batteries, whereby there is a lessening of the cost of the battery, a decrease in its weight, and an increase in its efficiency and capacity. It is a known fact that cast iron when brought to a red heat, say from 1200 to 1700 degrees F. and then cooled, takes on a certain degree of permanent expansion and that this expansion by repeated heatings and coolings may be carried forward sufficiently to enlarge the mass of metal so treated to a very considerable extent, from 40 to 50 per cent enlargement having been secured. In my application #128,258, filed October 25, 1916, I have described a method by which this permanent expansion of cast iron may be practically, expeditiously and economically performed, and by which the metal thus expanded may have imparted to it certain novel and very important characteristics.

The cast iron so expanded becomes uniformly and highly porous so that it may be readily permeated by fluids and other materials, and this quality of the metal is availed of in carrying out the process described in my aforesaid application, as it also is in practicing the invention which I shall herein describe. I have discovered that permanently heat-expanded cast iron may be used in the construction of electric batteries both storage and primary, to great advantage, and that its presence, when properly utilized, tends to give long life to the battery to increase its capacity and to maintain its electromotive force at a high degree for unusually long periods. As illustrative of one method of practicing my present invention I take a piece of permanently heat-expanded cast iron of suitable shape, as, for instance, a thin plate or a cylinder, and use this as one element of a secondary battery, after it has been subject to a forming process, in which it is one electrode, a lead plate the other, and an alkaline electrolyte is employed. During the forming process lead is deposited upon the iron electrode covering not only its exterior surfaces but the interior surfaces of its pores and channels as well, with a coating which intimately adheres thereto. I thus form an element for a secondary battery in which highly porous expanded iron is the supporting base or plate. Using this as the negative element of a storage battery and a pasted peroxidized lead plate as the positive element, and employing chromic and alkaline solution, with the addition of a small proportion of sulphuric acid as an electrolyte, satisfactory results have been obtained. The iron of the negative element is acted on only by the chromic solution, and being coated with a lead deposit the deterioration of the iron through the action of the electrolyte is prevented. The nature of the iron is such, being extremely porous and carrying lead on the inside walls of its pores and channels as well as on its exposed outer surfaces, that an extraodinarily large area of active material is subject to the action of the electrolyte. Moreover, this electrode is carried by a support that affords convenient paths to carry and distribute the electric current, so that the electrical, and consequent chemical, action of the battery is so distributed that the entire amount of active material can be utilized in a remarkably uniform and efficacious manner. This gives a high degree of capacity to the battery.

Another manner of carrying out the invention, especially when a "dry cell" form of secondary battery is desired, is as follows: Highly heated expanded cast iron in a finely divided condition, such as produced by the use of a coarse file, is mixed with lead oxide, preferably the peroxide and graphite. The proportions that I have found suitable are one part each of the powdered iron and graphite to eight parts of lead oxide. These are mixed together and formed into a paste, which is used in producing the negative element of the battery. The mixture for the positive element which I prefer to use is powdered metal, one part, powdered charcoal, one part, and lead oxide, fourteen parts, preferably using red lead and litharge in approximately equal proportions. These are initimately mixed and formed into a paste. These two compounds are then treated in a "forming" process, which may be of any usual or preferred character, until they are brought to proper condition to be placed in the battery.

The particles of iron, intimately and uniformly mixed through the mass of lead oxide, constitute a binder therefor, each particle being intimately united to the lead oxide immediately surrounding it. Each particle forms an electric conductor so that the internal resistance of the element is low, and throughout its entire mass there are formed paths for the ready transmission of electricity, and also for the action of the electrolyte due to the highly porous nature of the metal particles. Due, as I believe, to the nature of the iron used and the manner in which it is associated with the active material of the battery,—meaning the lead oxide or the spongy lead—I have been enabled to obtain many repeated discharges of high amperage from the battery in quick succession without the battery heating, and with a very slow fall in voltage. The battery recuperates with extraordinary quickness.

I believe that some electrochemical action takes place in the iron, which through its heat treatment has lost most of its impurities and has become partly transformed into protoxide of iron. I am led to this belief from the nature of the action of the battery, as the presence of the iron increases both the capacity and the E. M. F. of the battery, maintains high voltage discharges for an extraordinarily long period and repeated number of times, as well as maintains the battery in action at low voltage for very long periods. Its presence also prevents the reversing of the polarity of the elements under any conditions of use and test to which I have been able to subject the battery. This electrochemical action, which is in the nature of a galvanic excitement, I believe is the result of the action of the protoxide of iron against the lead coating, produced through the conductivity of the chromic crystals.

The proportions of the mixtures that I have indicated in describing the dry cell secondary battery are those from which I have obtained the most satisfactory results, but they may be varied both in proportion and composition and still many of the features of the invention retained. For instance, other forms of carbon than those described may be used, or the carbon element, which is inert so far as chemical effects are concerned, may be omitted altogether.

Another way of using the expanded iron in a battery is to impregnate thin plates of the metal with a suitable active material, such as lead oxide. This may be done by immersing the expanded iron when red hot in a bath of the molten oxide or other material, or by electrolysis.

Also, the expanded cast iron may be used in the form of a grid, and the lead oxide or other active material pasted on the grid, similar to the well-known Fauré pasted plate construction.

In making the dry cell battery that I have described I prefer to construct it as illustrated in the accompanying drawings, Figs. 1 and 2, where a form of cell that gives large surface areas in small space is illustrated.

Figure 1 of such drawings is a top plan view of an electric battery cell embodying my improvements.

Figure 2 is a vertical section thereof.

Figure 3 is a view of a grid for a storage battery made from the expanded cast iron herein described.

Referring to Figs. 1 and 2, 2 indicates a containing vessel, preferably square in cross section, and formed of sheet lead. Within this vessel are a series of concentric perforated lead cylinders, 3, 3', $3^2$, $3^3$, etc., more or less of these being used as may be found convenient, and as the size of the battery may suggest. Adjacent cylinders, as 3, 3' and $3^2$, $3^3$, are united at their lower ends, as indicated in Fig. 2, these united pairs of cylinders forming annular cups closed at the bottom but open at their upper ends, in which is placed the active material of the battery. Between the adjacent cups containing active material are arranged perforated insulating septi 4, which may be formed of perforated hard rubber bent into cylindrical form. The spaces between the active material-containing cups is occupied by the electrolyte, which is preferably dilute sulphuric acid. The active material constituting the positive element of the battery, indicated by 6, is preferably placed in the first and third, counting from the outside in the arrangement shown in the drawings, cups of the battery, while the active material constituting the negative element, designated by 7, is placed in the second and innermost or central cup. In the middle of the central, innermost cup, is located a rod of lead, 5, which constitutes part of the negative element of the battery, as does also the outer containing vessel 2. If it be found desirable to increase the amount of active material serving as the negative element of the battery it may be placed in the corners of the outer containing vessel, as indicated at 7', where it is retained by perforated plates 11 of lead, secured at their outer edges to the inner walls of the vessel 2 and at their lower edges to the bottom of such vessel. The several masses of active material and their containers, constituting respectively the positive and negative elements of the battery, are united by conductors, that uniting the positive elements being designated 8, and that connecting the negative elements, 10. The conductor 8 is provided with a terminal 9 for the external circuit, and the conductor uniting the negative elements with a connection 13 for the other terminal of such circuit. These last referred to parts may be of usual or preferred construction.

The lower ends of the cups or containers for the active material of the battery rest upon insulating supports 12 that serve to hold them above the bottom of the casing 2 in order to facilitate circulation of the electrolyte.

A battery cell constructed as described provides large surface area of active material; it makes provision for the use of active material of the kind described herein, which may be easily packed into the cups formed by the concentric cylinders 3; and is relatively cheap in construction as the plates 3 may be easily punched and shaped to form the retaining cups.

It will be understood that the containing vessel 2 when formed of lead should be encased by wood or other insulating material to prevent short circuiting when several of the cells are placed in proximity to constitute a battery.

When a cell of the form described is used as a "dry cell" the electrolyte employed is preferably of "jello" or some other semifluid form, and the upper ends of the spaces occupied by the electrolyte and of the cups containing the active material, are closed by cement in the usual manner.

While I have described the use of expanded cast iron in combination with lead or lead oxides, in a battery, it is to be understood that I do not limit myself to this combination, but may use the expanded cast iron in combination or association with other materials, and may use other solutions than chromic and alkaline solutions as the electrolyte.

What I claim is:

1. An electric battery having as an element porous heat-expanded cast iron.

2. An electric battery having incorporated in one of its elements finely divided heat-expanded cast iron.

3. A secondary battery having incorporated in the active material thereof finely divided porous heat-expanded cast iron.

4. A secondary electric battery having lead oxide as an active material and a metal other than lead in finely divided form mixed with the active material, the lead oxide being intimately united with the said other metal which serves as a conductor of electricity and electric energy throughout the mass of the active material.

5. A secondary electric battery having lead oxide as an active material and iron in finely divided form mixed with the active material, the lead oxide being intimately united with the said iron which serves as a conductor of electricity and electric energy throughout the mass of the active material.

6. A secondary electric battery having lead oxide as an active material and heat-expanded highly porous cast iron in finely divided form mixed with the active material, the lead oxide being intimately united with the said heat-expanded highly porous cast iron which serves as a conductor of electricity and electric energy throughout the mass of the active material.

7. A cell having a secondary electric battery consisting of a series of concentric annular cups the walls of which are perforated, active material in paste form constituting respectively the positive and negative elements of the battery placed in the said cups, the cups being separated from each other to allow free spaces for the electrolyte and insulating septi between the cups.

8. A cell for secondary electric batteries comprising an outer containing lead vessel constituting part of the negative element of the battery, a series of cups for containing the active material of the battery arranged in the said containing lead vessel and formed of pairs of concentric perforated lead cylinders united at their lower ends, active material in paste form, for the positive and negative elements of the battery, respectively, placed alternately in the said cups, insulating means between the said cups, and electric conductors uniting the containers for the positive and the negative elements of the battery, respectively.

9. An electric battery element having as an element iron, a portion of which has been changed to the protoxide of such metal.

10. An electric battery element of iron, a portion of which has been changed to the protoxide of such metal and having intimately united therewith lead oxide as an active material.

11. An electric battery element consisting of a highly porous metal serving as a supporting and conducting base the exposed surfaces and the walls of the pores of which are coated with the active material of the battery.

12. An electric battery element consisting of a highly porous iron as a supporting and conducting base, the exposed surfaces and the walls of the pores of which are coated with lead to serve as the active element of the battery.

SAMUEL B. PACK.